United States Patent [19]

Farber et al.

[11] 4,096,421

[45] Jun. 20, 1978

[54] PRESSING MACHINE, PARTICULARLY HOUSEHOLD REFUSE COMPACTOR AND CONTROL CIRCUIT THEREFOR

[75] Inventors: Karl-Heinz Farber; Rolf Mayer, both of Giengen, Germany

[73] Assignee: Bosch-Siemens Hausgerate GmbH, Munich, Germany

[21] Appl. No.: 587,954

[22] Filed: Jun. 18, 1975

[30] Foreign Application Priority Data

| | | |
|---|---|---|
| Jun. 27, 1974 | Germany | 2430903 |
| Jun. 27, 1974 | Germany | 2430902 |
| Jun. 28, 1974 | Germany | 2431109 |

[51] Int. Cl.[2] .......... H02P 7/28

[52] U.S. Cl. .......... 318/282; 318/258; 318/286

[58] Field of Search .......... 318/9, 14, 256, 258, 318/261, 264, 266, 280, 282, 283, 286, 474, 476, 477; 100/289

[56] References Cited

U.S. PATENT DOCUMENTS

| | | | |
|---|---|---|---|
| 3,543,676 | 12/1970 | Brown | 318/286 X |
| 3,628,112 | 12/1971 | Gross | 318/258 |
| 3,812,408 | 5/1974 | Penn et al. | 318/282 |
| 3,817,170 | 6/1974 | Mayer | 100/289 X |

*Primary Examiner*—Robert K. Schaefer
*Assistant Examiner*—W. E. Duncanson, Jr.
*Attorney, Agent, or Firm*—Michael J. Striker

[57] ABSTRACT

The pressing machine includes a pressing ram, a drive arrangement for moving the ram from a starting position to an end-of-stroke position and back to the starting position and includes an electric drive motor. A control arrangement establishes the end-of-stroke position for the ram. The control arrangement includes a direction-reversing circuit connected to the drive arrangement for reversing the direction in which the drive arrangement moves the ram and includes a direction-reversing relay arrangement having a current path for activating current. A controllable electronic switch is connected to the activating current path for controlling the activation of the direction-reversing relay arrangement. A control-signal-generating circuit controls the conductivity of the electronic switch by generating and applying to the control input of the electronic switch a control signal dependent at least upon the loading of the drive motor.

26 Claims, 5 Drawing Figures

PRESSING MACHINE, PARTICULARLY HOUSEHOLD REFUSE COMPACTOR AND CONTROL CIRCUIT THEREFOR

CROSS-REFERENCE TO RELATED APPLICATION

The present application relates to subject matter similar to that disclosed in commonly assigned copending application Ser. No. 579,501 of Rolf Mayer, entitled "PARALLELOGRAM TRANSMISSION USED FOR GENERATING A PRESSING FORCE, PARTICULARLY IN A HOUSEHOLD REFUSE COMPACTOR", filed on May 21, 1975. The entire disclosure of application Ser. No. 579,501 is incorporated by reference herein.

BACKGROUND OF THE INVENTION

The invention relates to pressing machines, particularly household refuse compactors, and still more particularly to the control circuitry employed in such machines.

With known pressing machines of the type in question, it is conventional to connect a direction-reversing relay directly in the current path of the drive motor of the machine. The relay is activated when the motor current and accordingly the motor output torque reach a predetermined value. However, with the known control circuits, the use of the motor-load-dependent direction-reversing relay makes it difficult to modify the pressing force furnished by the machine.

Easy adjustability of the pressing force would be very desirable, whether for the purpose of compensating for undesirable changes in pressing force occuring during operation, or whether for the purpose of taking into consideration the compressibility of the material to be pressed. The latter possibility is particularly meaningful in the case of household refuse compactors, because the refuse being compacted often varies in composition in a known manner. Particularly when vegetables are in season, the refuse will include a high proportion of vegetable material having a high sap or liquid content. It has been shown to be very advantageous to compress refuse of high liquid content only with such force as will not drive out the liquid from the material. Furthermore, for compacting packaging, such as empty tin cans, and for crushing bottles, and the like, a higher compacting force must be utilized. Accordingly, particularly with household refuse compactors, there is the need to be able, in a simple way, to adjust the compacting force supplied by the compactor in consideration of the composition of the refuse to be compacted.

Another problem with pressing machines of the type in question, particularly household refuse compactors, is that of stopping the ram when at the completion of its return stroke it reassumes the starting position. In known machines of this type, use is made of an electric motor and a speed-reducing transmission for moving the compacting ram down onto the refuse to be compacted. When the ram has reached its lowermost or end-of-stroke position the direction of the drive motor is reversed and the ram is lifted back towards the starting position.

In known pressing machines of this type, and especially with household refuse compactors, it is conventional to position an elastic member in the path of return movement of the ram, to cushion and stop the ram and assist in braking by absorbing as potential energy some of the kinetic energy of moving parts of the drive motor and intermediate transmission. However, this way of braking the arrangement has the disadvantage that stresses develop in the transmission, in the linkages connected to the compacting ram, and even in the support framework of the machine. These stresses may even be persistent—i.e., not become relieved even after all moving parts of the machine have come to a complete stop—for example because of friction and self-locking action in the drive and transmission. In order to avoid deformations of parts of the machine, these stresses must be taken into account when designing and dimensioning the parts of the machine. This necessarily leads to an increase in the weight and cost of the machine. But even so, the persisting stresses have an undesirable effect upon the transmission and most of all upon the mounting components.

The stresses developed in this way by the conversion of angular momentum into potential energy during the final coasting of the drive motor and transmission can be avoided by alloting a larger stopping distance for cushioning the ram to a stop, so that the angular momentum of the coasting motor will be dissipated virtually exclusively by the force of friction in the transmission. However, if a larger stopping distance is to be used, then either the total height of the compactor must be made greater or else, if the total height is to be kept unchanged, then there must be a decrease in the useful fraction of the ram stroke. These alternatives are both disadvantageous. If the machine is to be installed in the housing of a box-shaped piece of furniture difficulties arise; if the useful fraction of the ram stroke is to be decreased, then one must accept a marked decrease in the useful capacity of the machine.

Another problem with known pressing machines of the type in question, especially household refuse compactors, involves differences in the composition of the material to be pressed from one pressing operation to the next. For example, when pressing hard material objects, the ram stops suddenly and the inertia of the rotating mass of the rotor and possibly also of its transmission must be dissipated within fractions of a second. This sudden loss of momentum results in the generation of a dynamic (transient) pressing force component which is added to the pressing force component attributable to the output torque of the drive motor. In contrast, when pressing soft or yielding material, the momenton of the moving parts is more gradually dissipated over a longer period of time, as the actual pressing proceeds, so that, when the end-of-stroke activation of the motor-direction-reversing device occurs only the component of pressing force attributable to the motor output torque acts.

This dependence of the pressing force upon the compressibility of the material to be pressed is particularly disadvantageous in the case of household refuse compactors, because with these usually a very inhomogeneous composition of the material to be compacted is involved. Maximum pressing force, attributable to both the motor torque and momentum loss of the moving parts of the pressing machine is produced only when the pressing ram impacts directly upon an unyielding and hard object, for example a bottle, or the like. Only in such event is the pressing ram capable of crushing a bottle or squashing hard objects in the refuse, for example cans and packaging. However, with household refuse, such hard objects are frequently buried within or between soft and yielding material or objects, such as paper, vegetable refuse, or the like. In this event, the relatively low pressing force, resulting from the fact that the pressing ram and accordingly the drive motor are being stopped relatively gradually by the soft and yielding refuse, is insufficient to crush hard objects down to a small volume.

With a household refuse compactor, if it is to be assured that hard objects will be crushed, even if buried within or between soft and yielding material or objects, then it is necessary to increase the pressing force component directly attributable to drive motor output torque to such an extent that this component acting alone is sufficient to accomplish the desired crushing of the hard objects. However, then it must be considered that, in extreme cases, for example when wine bottles or the like are standing upright directly upon the floor of the refuse compartment, the ram may impact very hard upon such objects and come to a relatively violent stop. This results in the superposition of a high dynamic or transient pressing force component upon the already high-dimensioned pressing force component directly attributable to motor output torque. The total of these two strong components will itself be quite high, and this makes disadvantageous demands upon the strength of the machine construction. Accordingly, the machine must be designed on a worst-case basis, which generally involves the cost-increasing use of extra structural material and an undesirable increase of the weight of the machine.

SUMMARY OF THE INVENTION

It is a general object of the invention to provide a pressing machine, especially a household refuse compactor, which is not characterized by the disadvantages explained above.

It is a more particular object to provide a pressing machine, particulaly a household refuse compactor, in which the pressing force can be changed at will by the user of the machine in a very simple manner employing simple means.

It is another object to provide a pressing machine, particularly a household refuse compactor, in which the generation of stresses in the structure of the machine as the ram is returned to its starting position and is braked to a stop, is avoided.

It is yet another object to provide a pressing machine in which the pressing force exerted by the pressing ram is automatically so varied as to be in effect independent of the compressibility of the material to be compressed.

These objects, and others which will becomd more understandable from the description, below, of preferred embodiments, can be met, according to one advantageous concept of the invention, by providing a pressing machine, especially a household refuse compactor, in which use is made of a direction-reversing relay arrangement for reversing the direction of the drive motor which moves the pressing ram. Connected in the activating current path of the direction-reversing relay is a semiconductor switch whose conductivity determines the state of activation of the relay. An intermediate circuit arrangement interconnects the control input of the semiconductor switch and the circuit of the electric drive motor and applies to the control input of the semiconductor switch a control voltage dependent upon the drive motor current, and accordingly upon the drive motor output torque. The conductivity of the switch, and thereby the state of activation of the relay, is controlled automatically in dependence upon the output torque of the drive motor. The use of the variable control voltage furnished by the intermediate circuit arrangement makes it possible to change the moment at which the direction of the drive motor reverses, and accordingly at which the pressing stroke of the ram ends, in such a manner that the pressing force is settable virtually continuously to values between a lowest and a highest value.

Advantageously, the electric drive motor and direction-reversing circuit therefor are provided with a circuit arrangement which, as the ram returns towards its starting position and activates an end-position switch, activates the direction-reversing circuit (in preparation for the next stroke of the ram) and furthermore short-circuits the motor (e.g., short circuits the series connection of the motor and a resistor). The drive motor will act like a generator, and the kinetic energy of the rotating parts of the motor is quickly converted to electrical energy which is dissipated in the short-circuiting line. In this way, the braking of the drive motor as the ram is almost back to its starting position is particularly quick and positive, necessitating neither the shortening of the effective portion of the ram stroke nor an addition to the length of the ram stroke. The distance through which the ram moves subsequent to deenergization of the motor and prior to standstill of the ram is in this way limited to a minimum. This makes it possible to avoid development of transitory and persisting (locked-in) mechanical stresses of the type described above. The elastic cushioning member, used in the prior art to assist in the braking of the ram, can be dispensed with altogether, if desired.

Advantageously, use is made of a frequency-dependent intermediate circuit operative for modifying the control voltage so as to render the control voltage at least approximately proportional to the dynamic component of the pressing force. In this way, if the ram presses directly against hard objects, the control voltage will be caused to change markedly in correspondence to the sudden dynamic increase in pressing force. Accordingly, the direction-reversing relay arrangement for the drive motor will be activated earlier than when the ram presses against soft and yielding material. Thus, even when the dynamic component of the pressing force is high, the total pressing force can be kept approximately constant by effecting a compensatory decrease in that component of the total pressing force directly attributable to drive motor output torque.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
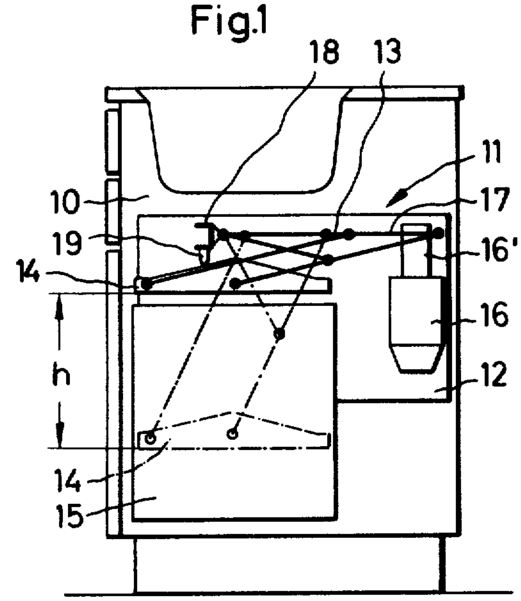
FIG. 1 schematically depicts a household refuse compactor.

FIG. 1 depicts somewhat schematically a household refuse compactor 11 incorporated into a housing 10 of a module of a modular kitchen. The compactor includes a frame 12, a parallelogram transmission 13 arranged within the confines of the frame 12, a compacting ram 14 and a container 15 for accommodating the refuse to be compacted or already compacted. The compacting ram 14 is driven, via the parallelogram transmission 13, by a drive motor 16 arranged vertically within the confines of the frame 12. Specifically, the output shaft of drive motor 16, via a speed-reducing transmission 16', turns a screw spindle 17. Each of the upper ends of the levels of the parallelogram transmission 13 is pivotally connected to a respective internally threaded nut which is threaded onto the screw spindle 17. When the screw spindle 17 turns, the two internally threaded nuts, which are spaced apart a distance corresponding to the fixed spacing between the upper ends of the levers of the parallelogram transmission 13, move jointly along the length of the screw spindle 17. In this way, the compacting ram 14 and the levers of the parallelogram transmission 13 are caused to move between their upper end position (shown in full lines in FIG. 1) and their lower position (shown in dash-dot lines in FIG. 1). At the upper portion of the compactor 11, higher than the upper end position of the compacting ram 14, there is located within the confines of the frame 12 a U-transverse 18 provided with a trip 19 for an end switch which is activated by the compacting ram 14 and which is described below in connection with the circuit diagram in FIG. 2.

Figure 2:
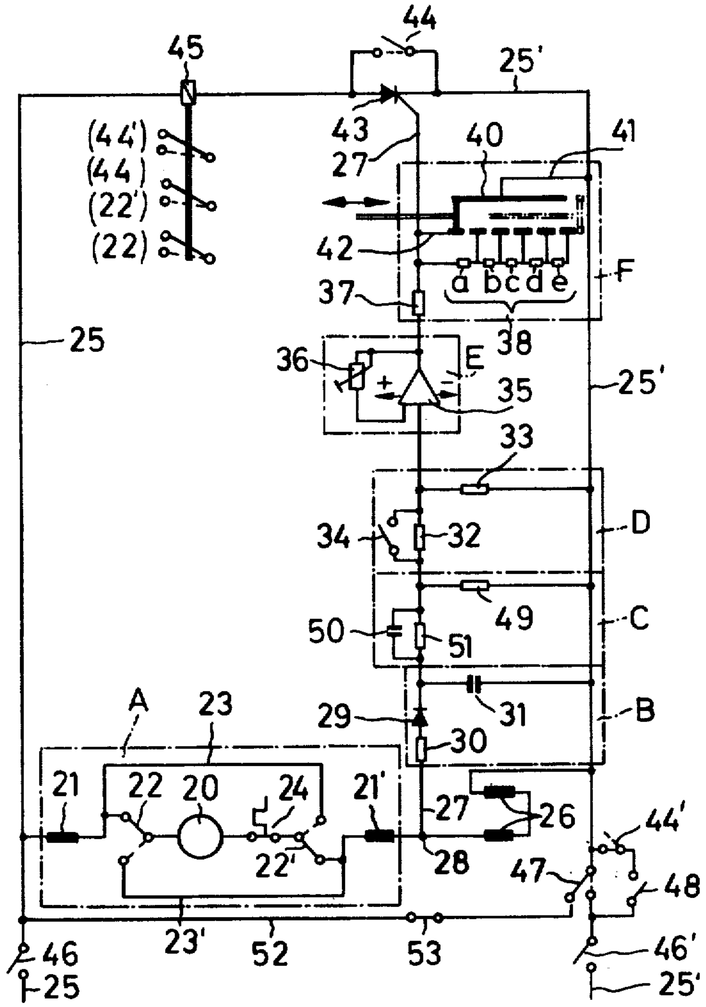
FIG. 2 is a circuit diagram of the drive motor and of the associated control circuitry.

The circuitry of the drive motor 16 is in toto designated by A in FIG. 2 and includes an armature 20 and field windings 21, 21'. In the motor current path there is located a changeover switch 22 between the field winding 21 and the armature 20, and a changeover switch 22' between the armature 20 and the field winding 21'. Each changeover switch 22, 22' has a moving contact and two stationary contacts. Arranged in the vicinity of the armature 20 are two bridgeover conductors 23, 23' which, in cooperation with the corresponding contacts of the two changeover switches 22, 22', can effect a polarity reversal of the armature and accordingly a direction reversal of the drive motor 16. The motor 16, as can be seen in the circuit diagram A thereof in FIG. 2, is further provided with an overload-preventing switch 24 having the form of a heat-responsive switch connected intermediate the armature 20 and the changeover switch 22'.

The connection of the two motor terminals of the drive motor 16 to the (non-illustrated) source of electrical energy is effected, on the one hand, via a line 25 connectable to such source and, on the other hand, via a resistor 26 connected to a line 25' likewise connectable to the source. In the illustrated embodiment, there is connected in series with the drive motor a resistive winding 26 wound in bifilar manner around the stator of the drive motor 16 for inductive and thermal compensation.

With respect to the flow of motor current, the drive motor 16 and the resistor 26 can be considered connected in series. Intermediate the drive motor 16 and the resistor 26 a control line 27 branches off, so that there is across the control line 27 and the line 25' leading to the energy source a fractional voltage whose magnitude is dependent upon the voltage-division ratio of the voltage divider constituted by the series connection of the drive motor 16 and the resistor 26. In this voltage divider the junction 28 with the control line 27 constitutes the voltage-divider tap, whereas the line 25' forms the voltage-divider foot. Connected between the control line 27 as it branches off from the voltage-divider tap 28 and the line 25+ is a filter stage B comprised of a rectifying diode 29, and a low-pass filter formed by a resistor 30 and a capacitor 31. The filter stage B serves to recitfy the control voltage derived from the voltage-divider tap 28 and then smooth the rectified voltage and to smooth and suppress voltage spikes in the control voltage attributable to motor commutation and to supply voltage hum.

Next connected in the control line 27 is a high-pass RC-filter stage C comprised of a resistor 49 connected between the control line 27 and the line 25', and the parallel combination of a capacitor 50 and a resistor 51 connected in the control line 27. In a manner described further below, the high-pass RC-filter stage C serves to modify the control signal in the control line 27 as derived from the voltage-divider tap 28 to transform the control signal into a voltage proportional to the pressing force rise.

Next connected in the control line 27 is a voltage divider stage D comprised of a first resistor 32 connected in the control line 27 and a second resistor 33 connected between the control line 27 and the supply line 25'. The first resistor 32 can be short-circuited by a normally open switch 34 having one fixed and one moving contact. The voltage divider stage D serves to decrease the compacting force of the refuse compactor 11, when necessary or desired; this is effected by closing the short-circuiting switch 34, which results in an increase in the control voltage present on the control line 27.

Next connected in the control line 27 is an amplifier stage E comprised of an amplifier 35, for example an operational amplifier, having an adjustable trimming potentiometer 36 connected as the feedback resistor 36 of the amplifier 35. The input of amplifier 35 is connected to the voltage-divider tap of the voltage divider stage D. The trimming potentiometer 36 makes possible fine adjustments of the circuit arrangement.

The last stage in the control line 27 is a voltage divider F. The last voltage-divider branch is constituted by a resistor 37 connected in the control line 27, whereas the second voltage-divider branch, connected between the voltage-divider tap at line 27 and the voltage-divider foot at line 25', is constituted by a resistor arrangement 38-41. The resistance 38 of resistor arrangement 38-41 is composed of five series-connected component resistors *a, b, c, d, e.* The resistor arrangement 38-41 further includes an electrically conductive wiper 39 which slides along a stationary electrically conductive contact strip 40 electrically connected by a conductor 41 to the supply line 25'. As the wiper 39 slides between its left end position (shown in solid lines) and its right end position (shown in broken lines), it electrically engages successive ones of six electrical contacts. The leftmost electrical contact is connected via a conductor 42 to the control line 27. The middle four electrical contacts are connected to respective ones of the junctions intermediate the component resistors *a, b, c, d, e*. The rightmost electrical contact is connected to the right terminal of the last component resistor *e*.

The component resistors *a, b, c, d, e,* the contacts connected thereto, the wiper 39, the contact strip 40, and the conductors 41 and 42 together form a step-by-step potentiometer.

The wiper 39, when in the illustrated left end position, connects the voltage-divider tap at line 27 directly to the voltage-divider foot at line 25', via the conductor 42, the contact strip 40 and the conductor 41, so that the effective resistance is zero. The wiper 39, when in the right end position (shown in broken lines), is not electrically engaged with any of the six electrical contacts nor with the contact strip 40.

The wiper 39 of voltage divider stage F serves, as described in more detail below, to compensate for the dependence of the transmission ratio of the parallelogram transmission 13 upon the extent to which the parallelogram transmission 13 is progressively displaced from its leftmost or starting position as a function of the displacement of the parallelogram transmission 13.

The voltage-divider tap of voltage divider stage D at control line 27 is connected to the gate of a thyristor or SCR 43 (or to the control electrode of another such electronic switch). The cathode of thyristor 43 is connected to the supply line 25', whereas its anode is connected to the supply line 25. Connected between the anode and cathode of thyristor 43 is a normally open switch 44 having one fixed and one moving contact. Switch 44 is a relay switch, activated in a manner described below, for short-circuiting the thyristor 43.

Connected in the supply line 25, intermediate the anode of thyristor 43 and the (non-illustrated) source, is a relay winding 45, in effect connected parallel to the drive motor 16. The state of energization of the relay winding 45 determines the positions of the four relay switches 22, 22', 44, 44'. When relay winding 45 is unenergized the switches 22, 22', 44, 44' are in the solid-line positions; when relay winding 45 is energized, the switches 22, 22', 44, 44' are on their broken-line positions. The relay switches 22, 22', as indicated before, serve to effect direction reversal of drive motor 16. The relay switch 44 serves as a self-locking switch for the relay winding 45. The relay switches 44 and 44' are shown in FIG. 2 as two separate switches, whereas in fact they share the same moving contact, as indicated in the upper left corner of FIG. 2.

There is connected in each of the two supply lines 25, 25' a respective part 46 or 46' of a two-pole appliance switch.

Connected in the supply line 25' is an end-position switch 47 having the form of a changeover switch comprised of a moving contact which electrically engages either a fixed contact connected in line 25' or a fixed contact at the right-hand end of a short-circuiting line 52. Limit switch 47 can be short-circuited by closing a normally open start switch 48 the moving contact of which can be briefly brought into the closed position by briefly pressing upon a start pushbutton. Mechanically coupled to start switch 48 is a normally closed switch 53 connected in the short-circuiting line 52. Connected in series with the start switch 48 in the short-circuiting line for limit switch 47 is the relay switch 44'. As indicated above, the moving contact of relay switch 44' is one and the same with the moving contact of relay switch 44.

Figure 5:
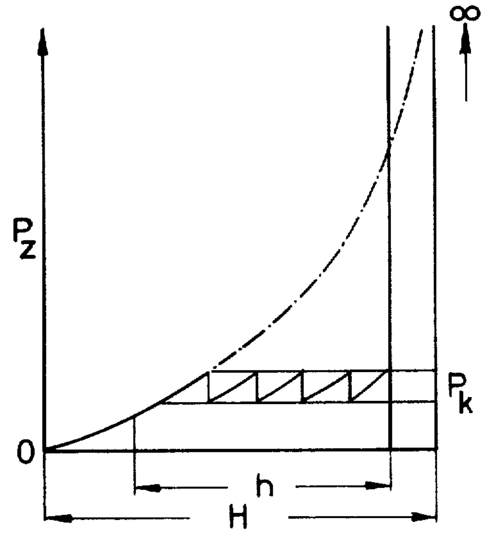
FIG. 5 is a graphical depiction of the effect of the compensation of the non-constant transmission upon the relationship between end-of-stroke ram position and end-of-stroke pressing force.

FIG. 5 is a graph of end-of-stroke pressing force versus end-of-stroke ram position, or alternatively end-of-stroke pressing force versus the end-of-stroke extent of displacement of the parallelogram transmission 13. When a pressing cycle is initiated, the drive motor, through the intermediary of the parallelogram transmission 13, causes the ram 14 to descend. Initially, the force exerted by the ram 14 is substantially zero because of the zero resistance presented to it by the empty space through which it moves. When the ram 14 contacts refuse the resisting force exerted upon the ram by the refuse increases as the refuse is progressively compressed. The force exerted by the ram upon the refuse is necessarily equal to this resisting force. As the pressing force rises, so also do the motor output torque and motor current. The ram ceases descending when the motor current reaches a predetermined value. If this predetermined value were a constant, then the end-of-stroke pressing force would be related to the end-of-stroke ram position in the manner represented in FIG. 5 by the tangent-function curve, the initial portion of which is shown rising from the origin as a solid line and then as a dash-dot line. Although the end-of-stroke motor output torque would be the same for all end-of-stroke ram positions, this would not be true of the end-of-stroke compacting force. This is because the transmission ratio of the parallelogram transmission 13 is not constant, but instead is a function of the extent to which the transmission is displaced, or equivalently is a function of the ram position.

Accordingly, the end-of-stroke pressing force would be a tangential function of the end-of-stroke ram position. In FIG. 5, the end-of-stroke ram position is plotted along the horizontal axis. The range H is the theoretical range of positions of the ram. H is equal to the length of the parallel levers of the parallelogram transmission 13, and the range H assumes that the levers can move from an upper end position in which they are oriented exactly horizontally to a lower end position in which they are oriented exactly vertically. The actual range of movement of the ram is smaller, of length *h*, and the actual end positions of the transmission levers are shown in solid (upper position) and dash-dot (lower position) lines in FIG. 1. The pressing force $P_z$ is in kilopounds.

In the illustrated embodiment, in a manner described below, the motor current value which when reached terminates the ram stroke is itself a function of the ram position. By making the end-of-stroke motor current a function of ram position, it is possible to establish virtually any desired relationship between the end-of-stroke value of the pressing force $P_z$, on the one hand, and the end-of-stroke position of the ram, on the other hand. One of the relationships which is to be preferred is that the end-of-stroke pressing force be constant for all end-of-stroke ram positions within a predetermined range of positions. This is in contrast to the relationship which prevails (see dot-dash curve in FIG. 5) when no compensation for the non-constant transmission ratio is provided. This matter is explained in detail in the commonly assigned application Ser. No. 579,501 referred to above, the entire disclosure of which is incorporated by reference herein.

In the illustrated embodiment, instead of a constant value for the end-of-stroke pressing force $P_z$, there is achieved an approximation of constant value. The end-of-stroke pressing force $P_z$ varies within a limited range $P_k$, which can be considered constant by comparison with the corresponding portions of the dash-dot curve.

The illustrated household refuse compactor operates as follows:

The compactor is readied for operation by first activating the two-pole appliance switch 46, 46', to thereby connect the supply lines 25, 25' to the two terminals of the non-illustrated D.C. voltage source. At this point all the switches in the circuit diagram of FIG. 2 are in their solid-line positions. To initiate operation of the compactor, the start pushbutton is briefly pressed, resulting in brief closing of the start switch 48. This closes the current path from supply line 25, through drive motor 16 (circuit A in FIG. 2), through resistor 26, through start switch 48 itself, to supply line 25'. While start switch 48 briefly remains closed, the short-circuiting line 52 is interrupted, because of the mechanical coupling between start switch 48 and switch 53. Accordingly, current flows through the just-defined motor current path, and the armature 20 of drive motor 16 turns.

The output shaft of drive motor 16, via the speed-reducing transmission 16', causes the screw spindle 17 to turn. As the screw spindle 17 turns, the aforedescribed internally threaded nuts thereon, to which the upper ends of the levers of the parallelogram transmission 13 are respectively connected, shift towards the left, together with the upper ends of such levers. This displacement of the parallelogram transmission 13 from its starting position causes the compacting ram 14 to descend into the refuse container 15.

After the ram 14 has descended a small distance a (non-illustrated) trip mounted either on the ram 14 or on one of the levers of the parallelogram transmission 13 trips the limit switch 47, causing switch 47 to assume its broken-line position. As soon as this occurs, the start pushbutton can be released without causing interruption of compactor operation.

As the ram 14 descends, the uncompacted refuse in the container 15 is pressed downwards and compacted. As the refuse is pressed down and compacted, it presents the compacting ram 14 with an increasing resisting force. The value of this resisting force, in FIG. 5, will lie somewhere below the initially upwards curving and then sawtooth-shaped curve in the abscissa range *h*. The refuse will usually be of inhomogeneous composition, and the resisting force which it offers — corresponding to the compacting force exerted upon it by the ram 14 — will fluctuate as it rises within the above-indicated region in FIG. 5, and finally reach a maximum value on either the solid-line section of the upwards curve or on the sawtooth-shaped section of the curve, in the abscissa range *h*.

As the compacting force rises in this fluctuating manner in the aforementioned range, the loading on the drive motor 16 increases correspondingly. In consequence of the resulting increase in the current drawn by the motor, the voltage drop across the resistor 26, connected in series with the drive motor 16 (circuit A in FIG. 2), will likewise increase, causing a rise in the control voltage on the control line 27. The control voltage is rectified in filter stage B by the diode 29 and then smoothed by the low-pass filter constituted by the resistor 30 and capacitor 31, so that voltage spikes attributable to commutation of the armature 20 and also to the hum in the supply voltage will be suppressed.

For purposes of explanation, the presence of the voltage divider stage F and the amplifier stage E in the control line 27 will be initially ignored. Accordingly, the control voltage on control line 27 will be applied to the gate of thyristor 43. As the compacting force rises, so also does the motor current. The voltage-division ratio between motor 16 and resistor 26 changes, and the control voltage applied to the thyristor gate rises until the firing voltage of the thyristor 43 is reached. When the thyristor 43 becomes conductive, this closes the current path from the supply line 25 through the relay winding 45 to the supply line 25'. Upon energization of relay winding 45, the relay switches 22, 22' between the field windings 21, 21' and the armature 20 move from their solid-line positions to their broken-line positions. Likewise, the self-locking relay switch 44 closes, thereby bridging thyristor 43 and establishing a self-locking action for the relay winding 45, and the relay switch 44' opens thereby rendering the start switch inoperative.

Thus, if for any reason the user of the compactor again presses the start pushbutton before the compactor has completed the already initiated cycle, or keeps the start pushbutton depressed for a prolonged period, this will have no effect upon the operation of the compactor.

When as just mentioned the relay winding 45 becomes energized, there results, via the changeover switches 22, 22' and the bridgeover lines 23, 23', a reversal of the direction of current flow through motor armature 20. This leads first to a positive braking and then a direction reversal of the armature 20. As a result, the compacting ram 14 is lifted by the parallelogram transmission 13 to a height just short of the upper end position shown in solid lines in FIG. 1. When this somewhat lower height is reached, the end-position switch 47 returns to its solid-line position, thereby interrupting the current path through motor 16 and resistor 26 and interrupting the current path through relay winding 45 and the thyristor 43 or the parallel-connected relay switch 44. As a result, the relay winding 45 becomes deenergized, and the relay switches 22, 22' and 44, 44' all return to their solid-line positions. At this point renewed depression of the start pushbutton and concomitant closing of start switch 48 will initiate another stroke of the compacting ram 14.

Using the voltage divider stage D connected between the control line 27 and the supply line 25', it is possible to change at will the control voltage present on control line 27 and derived from the voltage-divider tap 28, in order to change the end-of-stroke pressing force exerted by the compacting ram 14. This is accomplished very simply by closing the short-circuiting switch 34, to short-circuit voltage-divider resistor 34. As a result, substantially the full control voltage is applied to the gate of thyristor 43. Accordingly, the requisite firing voltage of the thyristor is reached at a lower motor current than otherwise, and thus there is established a lower value for the end-of-stroke compacting force.

With the amplifier stage E and the voltage divider stage F, omitted from the foregoing discussions of the operation, it is possible to take into account, in a very simple way, the composition of the refuse which is to be compressed. Specifically, the higher pressing force will be used only in those cases where it is necessary to crush hard and strong objects such as empty cans, bottles, or the like. This mode of control is particularly well suited for compactors of the type wherein the end-of-stroke compacting force is the same irrespective of the end-of-stroke ram position, for example wherein the compacting ram is driven by the drive motor through a constant-transmission-ratio transmission such as a screw spindle.

With this expedient, care must be taken to in some manner neutralize the effect of the high starting current of the drive motor which flows during compactor startup; otherwise, soon after the initiation of operation the control voltage on control line 27 would reach the firing voltage of the thyristor 43, resulting in energization of relay winding 45 and the consequent motor direction reversal. Such unintended premature motor direction reversal can be avoided in the simplest way by providing between the control line 27 and the supply line 25' a short-circuiting branch containing an end-position switch which opens only after the ram has reached a position assumed to correspond to a moment when the high starting current has ceased to flow.

However, with compactors employing transmissions which do not have a constant transmission ratio, as is the case with the parallelogram transmission 13 herein, the end-of-stroke compacting force is dependent upon the end-of-stroke ram position. To compensate for the lack of constancy in the transmission ratio, it is particularly advantageous to couple the wiper 39 of the voltage divider stage F to the parallelogram transmission (or to another part of the mechanism which moves therewith, such as the screw spindle, the ram itself, the drive motor output shaft, etc.). In the illustrated embodiment, this is accomplished using a (non-illustrated) screw spindle which is driven off the main screw spindle 17 of the compactor 11 by means of a gear mounted on the screw spindle 17, such gear providing an appropriate speed-reducing transmission ratio (see FIG. 1). Instead of this way of coupling the wiper 39 and the parallelogram transmission, use can be made of other known coupling expedients, for example direct connection to the parallelogram transmission, use of gearings or other transmissions, rope linkages or hydraulic means. Alternative expedients are disclosed in commonly owned application Ser. No. 539,501, referred to above.

The manner in which the voltage divider stage F compensates for the lack of constancy of the transmission ratio of the parallelogram transmission 13 will be explained with reference to FIG. 5.

Brief closing of the start switch 48 sets the drive motor 16 into operation in the aforedescribed way. At the start of operation, the wiper 39 is in the solid-line position of FIG. 2. In this position, and in cooperation with the contact strip 40 and the conductors 41 and 42, it establishes a short-circuit between the control line 27 and the supply line 25', thereby preventing the high starting current of the motor from prematurely rendering thyristor 43 conductive.

As the compacting ram 14 starts to descend, the wiper 39 moves rightwards (as viewed in FIG. 2), electrically engaging successive ones of the contacts of the component resistors *a, b, c, d, e*. If during its descent ram 14 encounters no significant resistance the wiper 39 will proceed rightwards along the contact strip 40 until it reaches its broken-line end position. In this position of wiper 39, the current path through the potentiometer branch 38-41 is interrupted. As a result, the voltage present at the input terminal of voltage divider stage F is substantially fully applied to the gate of the thyristor, thereby causing the thyristor to be fired. When thyristor 43 is fired, relay winding 45 becomes energized, resulting, in the manner described above, in a motor direction reversal causing the compacting ram 14 to be lifted back to its starting position. In this way, the wiper 39 serves the function of a lower-end-position switch. Specifically, the broken-line end position of wiper 39, wherein the wiper 39 engages neither the contact strip 40 nor any of the six smaller step contacts, determines the lowest end-of-stroke position which the compacting ram 14 can ever reach. Essentially the same stroke termination action will occur if, for any reason, for example as a result of malfunction or a mechanical defect, the wiper 39 lifts off from the contact strip 40 before actually reaching its broken-line end position.

If during its next descent the ram 14 encounters significant resistance, then the current drawn by motor 16 increases until the control voltage at the tap of voltage divider stage F reaches the firing voltage of the thyrister 43. With the resistances 38 in effect disconnected from the circuit, the firing voltage will be reached only when the compacting force has increased to reach a point on the solid-line curve in FIG. 3. However, with the help of the stepwise connected resistors *a* to *e*, and the parallelogram-displacement-dependent shifting of the wiper 39, the maximum (end-of-stroke) compacting force is limited to the region intermediate the horizontal straight lines $P_k$, with the relationship between end-of-stroke compacting force and end-of-stroke ram position having the illustrated sawtooth-shaped character.

As an alternative to the step-by-step potentiometer of the illustrated embodiment, use could be made of a substantially continuous potentiometer. If this is done, then the sawtooth-shaped relationship between end-of-stroke pressing force and end-of-stroke ram position illustrated can be reduced to a substantially constant value for the end-of-stroke pressing force for all values of the end-of-stroke ram position within the range *h*, or at least within the upper portion of the range *h*. This alternative is discussed in commonly assigned application No. 579,501.

By suitably selecting the number and resistances of the resistors 38 in the voltage divider stage F, virtually any desired relationship between the end-of-stroke compacting force and the end-of-stroke ram position can be established.

The amplifier stage E serves to so amplify the control voltage for the thyristor 43 that the latter always will reach a value high enough to fire the thyristor. The trimming potentiometer 36 makes it possible to change the scale of the selected relationship between the end-of-stroke compacting force and the end-of-stroke ram position without altering the basic shape of that characteristic.

By suitably dimensioning the resistor 37 and resistances *a* to *e* in the voltage divider stage D, it can be achieved that, the high control voltage resulting from the high starting current of the drive motor 16 fires the thyristor 43, in so far as the control line 27 and the line 25' via the wiper 39, the contact strip 40 and the two conductors 41, 42 in voltage divider stage D, or a supplemental switch configurated as an end-position switch, are short-circuited. In this way, there is produced the great advantage that with each automatic renewed start-up of the drive motor 16 occuring after, for example, a malfunction such as a temporary loss of the supply voltage or an opening of the overload switch 24, in which case the ram 14 stops in a position other than its upper end or starting position, with the wiper 39 accordingly stopping at an intermediate position — all this results in firing of thyristor 43. In this way, when the drive motor 16 is started up again, the relay winding 45 will become energized immediately, so that the compacting ram 14, after an interruption or malfunction of the drive, automatically and necessarily is lifted to its upper end position.

Upon releasing the start switch 48, the contacts of switch 48 open, and shortly thereafter the switch 53, mechanically coupled to start switch 48, opens. However, the moving contact of end-position switch 47 has already moved to its broken-line position, and accordingly the path provided by short-circuiting line 52 is interrupted.

Because of the angular momentum in the armature 20 present upon interruption of the motor current path, the armature 20 for a while continues to turn in the original direction, despite the fact that the polarity of the motor voltage has been reversed. Accordingly, for this limited time the motor acts as a current generator, and the kinetic energy of the armature is converted into electrical energy. Because of the low-resistance path provided by the short-circuiting line 52, this electrical energy and accordingly the kinetic energy are dissipated very quickly, so that the armature 20 is quickly and positively braked.

The next time the start switch 48 is briefly closed, another compacting stroke of the ram 14 will be initiated. In this phase of the movement of the compacting ram, the control line 27 is short-circuited to the supply line 25' by means of the voltage divider stage F. Accordingly, the high control voltage resulting from the high motor start-up current cannot result in firing of thyristor 43; accordingly, the high control voltage cannot unintentionally switchover the drive motor which is already in the downwards ram mode.

As already briefly mentioned in connection with the circuit diagram of FIG. 2, the RC-stage C in control line 27, compensates for the pressing force increase attributable to the dynamic component of pressing force resulting when hard objects in the refuse are being compressed. However, before explaining the operation of the RC-circuit C, reference will be made to the graph in FIG. 3, which depicts the relationship between the compacting force increase, on the one hand, and, on the other hand, the rate of the compacting force increase with respect to time, this rate being dependent upon the compressibility of the material to be compacted.

Figure 3:
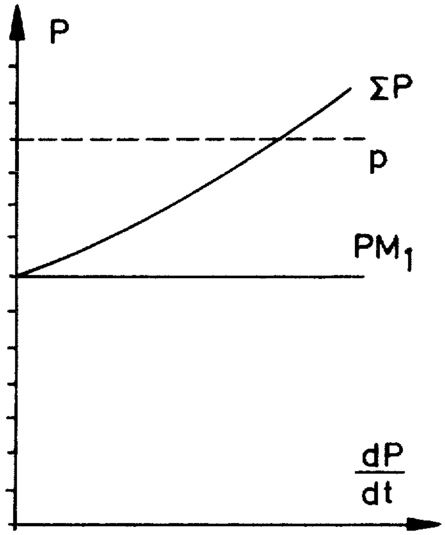
FIG. 3 is a graph of the variation with respect to time of the pressing force, with the dynamic component of the pressing force uncompensated.

In the graph of FIG. 3, the rate of change (with respect to time) of the compacting force ($dP/dt$) is plotted along the abscissa, whereas the pressing force (P) is plotted along the ordinate. Points on the horizontal straight line $PM_1$ represent that component of the compacting force directly attributable to the drive motor output torque at the time of direction reversal. The corresponding points on the curve $\Sigma P$, in contrast, represent the total compacting force, which is higher by the amount of the dynamic component of the compacting force.

As can be seen from FIG. 3 the dynamic component of the compacting force which, in certain circumstances can exceed by a multiple the component of compacting force directly attributable to motor output torque, and the higher, the higher is $dP/dt$ — i.e., is the rate of increase of the compacting force. However, this rate of increase is the greater, the more incompressible or the harder is the refuse to be compacted or the objects therein. Thus, if there is present in the container 15 for example a wine bottle which is standing upright within the refuse and will not yield to the force of the descending ram 14, the ram becomes all but blocked, and the rotating mass of the drive motor 16 and the moving mass of the descending ram 14 lose momentum very suddenly. In such event, there is produced a total compacting force $\Sigma P$ with an extremely high dynamic component.

On the other hand, if the objects in the refuse to be compacted are all soft and yielding, the compacting force rises only slowly. This results in a comparatively slow and gradual momentum loss of the rotating mass of the drive motor and of the descending mass of the ram, so that the dynamic component of the compacting force will be correspondingly smaller. In the extreme case, as $dP/dt$ becomes smaller and smaller, the total compacting force $\Sigma P$ is determined almost exclusively by the output torque of the dirve motor and assumes the valve $PM_1$.

With the relationship depicted in FIG. 3, the aforedescribed relationships have the effect that, for example, a bottle which is capable of resisting a compacting force having a value beneath the broken line $p$ in FIG. 3, will be crushed only when the total compacting force exceeds this value $p$. From the intersection of the line $p$ and the curve $\Sigma P$ it follows however that this is the case only if the bottle is not, or at most is to only a negligible extent, yieldingly embedded between other objects. However, if it is desired to achieve, in every case, the decrease of the volume of the refuse to be compacted along with the crushing of the bottle, then with the prevailing relationships, the compacting force component attributable exclusively to the drive motor output torque must be raised to a value $PM_2$ lying above the level of the line $p$ symbolizing the force required for the crushing of the bottle.

Figure 4:
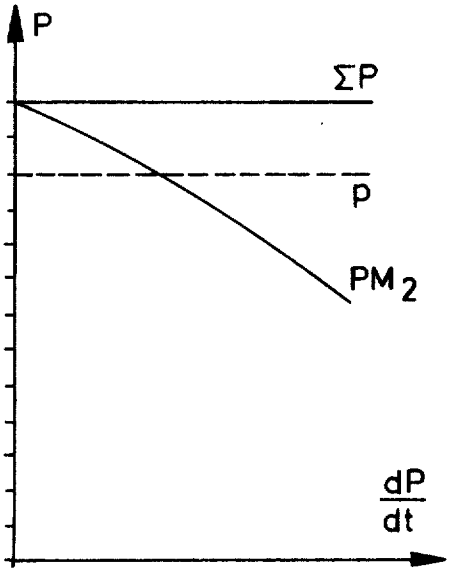
FIG. 4 is a graph of the variation with respect to time of the pressing force, with the dynamic component of the pressing force compensated.

With the RC-circuit C in FIG. 2, the dynamic compacting force component, which rises in proportion to the rate of change of the compacting force, and accordingly in proportion to the rate of momentun loss, is compensated in such a manner that the total compacting force $\Sigma P$, as shown in FIG. 4, remains constant over the entire region. This is achieved by exploiting the fact that the rate of change with respect to time of the control voltage derived from the voltage-divider tap 28 is approximately proportional to the rate of change with respect to time of the compacting force exerted by the ram. The control voltage across resistor 26 is rectified and smoothed by the filter stage B, and, in the case of a high rate of increase of the compacting force compared to a low one, the control voltage is boosted by the RC-circuit C, so that when compacting hard objects, with a concomitant higher rate of increase of the compacting force, the firing voltage of thyrister 43 is reached considerably sooner than with a lower rate of the compacting force. As a consequence, the relay 45 becomes energized considerably sooner, as a result of which the motor direction reversal occurs correspondingly sooner.

By appropriately dimensioning and matching the components of the filter stage B and of the RC-circuit C, it is possible to so influence the switchover point of the drive motor 16 that at any given moment the compacting force component dependent upon motor output torque will be reduced by an amount corresponding to the associated dynamic compacting force component, with the total compacting force $\Sigma P$ remaining substantially constant. The component of the compacting force dependent upon drive motor torque accordingly produces the downwardly sloping leg of the curve $PM_2$ in FIG. 4.

As a result of the connection of resistor 51 in parallel to capacitor 50 in the control line 27, in RC-circuit C, even with a low rate of increase of the voltage in control line 27, a base voltage will be maintained in the line 27, this base voltage after elapse of a correspondingly longer time leading to firing of thyristor 43.

The motor direction reversal occurring upon energization of relay winding 45 is effected by means of the two relay switches 22, 22' and by the associated bridge-over lines 23, 23'. The drive motor 16 after a short braking time starts up in the opposite direction and raises the compacting ram 14 via the parallelogram transmission 13 to such an extent that it, before reaching its upper end position (shown in FIG. 1 in solid lines) activates the moving contact of the end-position switch 47. In this way, the switch 47 interrupts the current path through motor 16 and resistor 26. Also interrupted is the current path through relay winding 45 and thyristor 43 (or through the switch 44 in parallel with thyristor 43). The moving contact of end-position switch 47 moves to its solid-line position, thereby simultaneously closing the short-circuiting line 52. The relay winding 45 becomes deenergized, and accordingly the associated relay switches 22, 22', 44, 44' all return to their solid-line positions.

It will be understood that each of the elements described above, or two or more together, may also find a useful application in other types of circuits and constructions differing from the types described above.

While the invention has been illustrated and described as embodied in a household refuse compactor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A pressing machine, particularly a household refuse compactor or the like, comprising, in combination, a pressing ram; drive means for moving said ram from a starting position to an end-of-stroke position and back to said starting position and including an electric drive motor; and control means for establishing the end-of-stroke position of said ram, including a direction-reversing circuit connected to said drive means for reversing the direction in which said drive means moves said ram and comprising a direction-reversing arrangement having a current path for activating current, a controllable electronic switch connected to said current path for controlling the activation of said direction-reversing arrangement, and control-signal-generating means connected to said drive motor and operative for controlling the conductivity of said switch by generating and applying to the control input of said electronic switch a control signal dependent upon the current flowing through said drive motor, and including compensating means operative for establishing a predetermined relationship between the pressing force exerted by said pressing ram and the drive motor current by automatically varying the relationship between said control signal and said drive motor current.

2. A machine as defined in claim 1, wherein said drive means includes a pair of voltage supply lines, said electric drive motor having a current path connected between said voltage supply lines, and wherein said control-signal-generating means includes resistance means connected in said current path of said electric drive motor and means for applying to said control input of said electronic switch a control voltage dependent upon the voltage drop across said resistance means and thereby dependent upon motor current and motor load.

3. A machine as defined in claim 2, wherein said electronic switch is a thyristor and said control input is the gate electrode thereof.

4. A machine as defined in claim 3, wherein said electric drive motor has a stator, and wherein said resistance means comprises a resistive bifilar winding wound around said stator.

5. A machine as defined in claim 3, wherein said direction-reversing arrangement comprises a relay winding, and wherein said relay winding and said thyristor are connected in series one next to the other.

6. A machine as defined in claim 3, wherein said direction-reversing arrangement comprises a relay winding, and wherein said relay winding and said thyristor are connected in parallel.

7. A machine as defined in claim 2, wherein said direction-reversing arrangement comprises a relay winding and a self-locking relay switch connected across said electronic switch and controlled by said relay winding.

8. A machine as defined in claim 2, wherein said means for applying said control voltage comprises a voltage divider stage comprised of a voltage divider having an input connected to said resistance means for receiving a voltage dependent upon the motor-current-dependent voltage drop across said resistance means and having two voltage-divider branches and a voltage-divider tap connected to said control input of said electronic switch, and short-circuiting means activatable by the user of the machine for varying the voltage-division ratio of said voltage divider.

9. A machine as defined in claim 1, wherein said control means further includes means operative when due to malfunction current flow through said drive motor is interrupted and said ram is out of said starting position for automatically causing said drive means to move said ram back to said starting position upon re-establishment of current flow through said drive motor.

10. A machine as defined in claim 1, wherein said control means further includes start-up means operative while said ram is within a range of positions near said starting position for preventing said control-signal-generating means from applying to said control input of said electronic switch a control signal such as could cause said drive means to reverse direction and move said ram back to said starting position, whereby while said ram is performing the initial portion of a stroke the flow of high start-up current through said drive motor will not initiate premature return movement of the ram.

11. A machine as defined in claim 10, wherein said control-signal-generating means has an output constituting a control line, and wherein said drive means includes a pair of voltage supply lines, said drive motor being connected across said voltage supply lines, and wherein said start-up means comprises means automatically operative for establishing a short-circuit between said control line and one of said voltage supply lines upon start-up of said motor and until said ram has moved outside said range of positions.

12. A machine as defined in claim 1, wherein said control means further includes means automatically operative when said ram has returned almost to said starting position for short-circuiting said electric drive motor to establish a path for the flow of motor braking current to thereby quickly brake said drive motor.

13. A machine as defined in claim 1, wherein said control means further includes means for automatically connecting across said electric drive motor a low resistance current path as said ram approaches said starting position during its return thereto, whereby to dissipate the kinetic energy of moving parts of said drive motor in the form of electrical energy in said low resistance current path.

14. A machine as defined in claim 1, wherein said control means further includes an end-position switch located to be activated by said ram when said ram approaches said starting position during its return thereto, and means automatically operative in response to activation of said end-position switch for connecting across said electric drive motor a low resistance current path, whereby to dissipate the kinetic energy of moving parts of said drive motor in the form of electrical energy in said low resistance current path.

15. A machine as defined in claim 1, wherein said direction-reversing arrangement has a first activation state and a second activation state for causing said drive means to move said ram in first direction from said starting position to the end-of-stroke position and in opposite second direction, respectively, and wherein said control means further includes an end-position switch located to be activated by said ram when said ram approaches said starting position during its return thereto, and means automatically operative in response to activation of said end-position switch for connecting across said drive motor a low resistance current path, whereby to dissipate the kinetic energy of moving parts of said drive motor in the form of electrical energy in said low resistance current path, and for causing said direction-reversing arrangement to assume said first state of activation in preparation for the next movement of said ram in said first direction.

16. A machine as defined in claim 1, wherein said direction-reversing arrangement has first and second activation states for causing said drive means to move said ram in first and second directions away from and back to said starting position, respectively, and wherein said control means further includes a low resistance current path, and an end-position switch having an unactivated position in which it establishes a path for the flow of activating current through said end-position switch and through said direction-reversing arrangement and an activated position in which it establishes a path for the flow of motor braking current through said motor and said low resistance current path and said end-position switch and means for causing said end-position switch to move from said unactivated to said activated position when said ram approaches said starting position while moving in said second direction, whereby to dissipate the kinetic energy of moving parts of said drive motor in the form of electrical energy in said low resistance current path, and whereby to cause said direction-reversing arrangement to assume said first activation state in preparation for the next moving of said ram in said first direction.

17. A machine as defined in claim 16, wherein said end-position switch when in said unactivated position forms part of the current path of said drive motor, and wherein said control means further includes a start switch connected across said end-position switch and a further switch connected in said low resistance current path and mechanically coupled to said start switch in such a manner that when said start switch is being closed said further switch opens and is fully open before said start switch becomes fully closed.

18. A pressing machine, particularly a household refuse compactor or the like, comprising, in combination, a pressing ram; drive means for moving said ram from a starting position to an end-of-stroke position and back to said starting position and including an electric drive motor; and control means for establising the end-of-stroke position of said ram, including a direction-reversing circuit connected to said drive means for reversing the direction in which said drive means moves said ram and comprising a direction-reversing arrangement having a current path for activating current, a controllable electronic switch connected to said current path for controlling the activation of said direction-reversing arrangement, and control-signal-generating means operative for controlling the conductivity of said switch by generating and applying to the control input of said electronic switch a control signal dependent upon the loading of said drive motor, wherein said drive motor has an output shaft and wherein said drive means further includes a transmission connected between said output shaft and said pressing ram, said transmission having a transmission ratio which is a function of the extent to which said transmission is displaced and accordingly a function of the position of said pressing ram, and wherein said control means further includes compensating means for compensating for the ram-position-dependent transmission ratio of said transmission by automatically varying said control signal as a predetermined function of the position of said ram.

19. A machine as defined in claim 18, wherein said transmission is a parallelogram transmission.

20. A machine as defined in claim 18, wherein said compensating means comprises an adjustable-transfer-function circuit having an input connected to said resistance means for receipt of a motor-current-dependent voltage and having an output connected to said control input of said electronic switch, and means operative for effecting the compensation by automatically varying the transfer function of said adjustable-transfer-function circuit in dependence upon the extent to which said transmission is displaced.

21. A machine as defined in claim 20, wherein said adjustable-transfer-function circuit is a voltage divider circuit.

22. A machine as defined in claim 21, wherein said voltage divider circuit comprises a voltage divider having two voltage divider branches, one of said branches being constituted by a plurality of discrete component resistors and a wiper movable to connect into circuit successive ones of said resistors, and wherein said means for automatically varying the transfer function of said adjustable-transfer-function circuit comprises means coupling said wiper to a moving part of the machine whose position is indicative of the extent of displacement of said transmission.

23. A machine as defined in claim 22, wherein said wiper is movable between two end positions, and wherein said component resistors are so dimensioned that for each intermediate position of said wiper the voltage-division ratio of said voltage divider is such that the value of the control signal applied to said control input during the flow of start-up current through said drive motor renders said electronic switch conductive and causes said drive means to move said ram to said starting position, whereby if due to malfunction the current flow through said drive motor is interrupted the ram will be automatically returned to said starting position upon the resumption of current flow.

24. A pressing machine, particularly a household refuse compactor or the like, comprising, in combination, a pressing ram; drive means for moving said ram from a starting position to an end-of-stroke position and back to said starting position and including an electric drive motor; and control means for establishing the end-of-stroke position of said ram, including a direction-reversing circuit connected to said drive means for reversing the direction in which said drive means moves said ram and comprising a direction-reversing arrangement having a current path for activating current, a controllable electronic switch connected to said current path for controlling the activation of said direction-reversing arrangement, and control-signal-generating means operative for controlling the conductivity of said switch by generating and applying to the control input of said electronic switch a control signal dependent upon the loading of said drive motor, wherein said control means includes frequency-dependent circuit means operative for modifying said control signal to render said control signal at least approximately proportional to the dynamic component of the pressing force exerted by said pressing ram.

25. A machine as defined in claim 24, wherein said frequency-dependent circuit means is an RC-circuit electrically connected intermediate said drive motor and said control input of said electronic switch.

26. A machine as defined in claim 25, wherein said RC-circuit includes a capacitor and connected in parallel thereto a resistor.

* * * * *